Aug. 12, 1969   R. P. BRENNER ET AL   3,460,792
RESTRAINT LATCH
Filed March 29, 1967
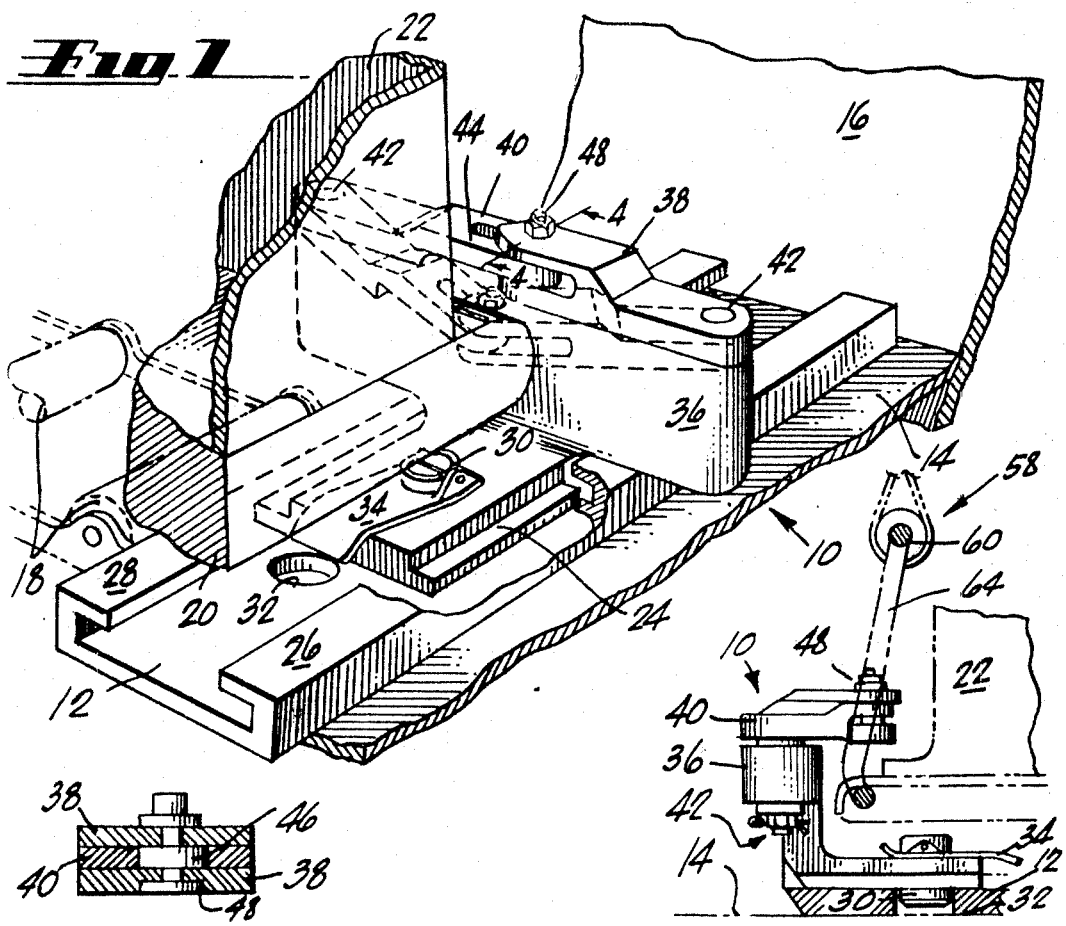
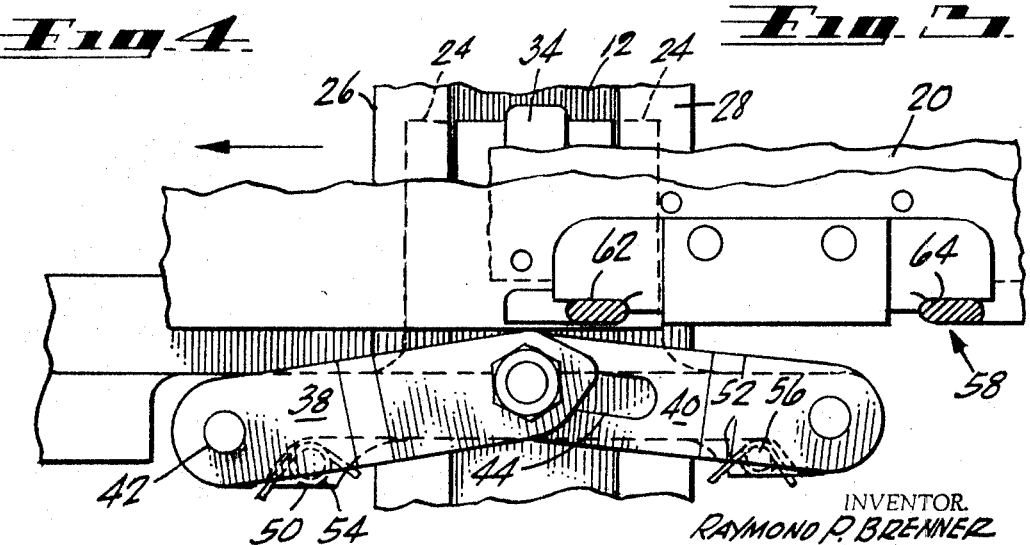
INVENTOR.
RAYMOND P. BRENNER
BY ROBERT A. WARREN
Jack E. Munro
-AGENT-

United States Patent Office 3,460,792
Patented Aug. 12, 1969

3,460,792
RESTRAINT LATCH
Raymond P. Brenner, Whittier, and Robert A. Warren, Long Beach, Calif., assignors to McDonnell Douglas Corporation, Santa Monica, Calif., a corporation of Maryland
Filed Mar. 29, 1967, Ser. No. 626,785
Int. Cl. B60p 7/06
U.S. Cl. 248—361                                    3 Claims

ABSTRACT OF THE DISCLOSURE

A latch applicable for use with cargo handling apparatus and specifically to restrain vertical movement of a cargo handling pallet. The latch includes spring biased restraining arms which automatically retract to permit passage of the pallet during pallet movement.

BACKGROUND OF INVENTION

In the transporting of cargo in vehicles it is usually a must that the cargo be restrained against all movement. All vehicles whether a truck, train, ship or plane, that is designed to carry cargo, has some apparatus included therein to (1) securely retain the cargo against all movement during transporting, and (2) to facilitate ease of loading and unloading of the cargo in the same time. In aircraft the problem of loss of time in the loading and unloading is particularly acute. It is imperative that minimum time be used in the loading and unloading operations.

Most present cargo handling systems are designed to use a pallet as the basic load supporting surface. Usually the load is secured to the pallet and the pallet in turn is restrained within the vehicle. The pallet restraint apparatus includes a longitudinal movement restraint, a transverse movement restraint and a vertical movement restraint. A common type of transverse movement restraint is a pair of longitudinal side rails, one on each side of the pallet. Usually, these rails include a protruding lip to overlap the edge of the pallet thereby providing the vertical restraint. However, fixed side rails are not adequate as not all pallets are uniform in size. Pallet size depends upon the particular type of vehicle and the cargo to be transported. It is common for pallets to vary in width from 88 inches to 125 inches. To accommodate such a variance in pallet width it was necessary that the side rails be capable of being relocated to different positions, usually a track and detent arrangement is employed.

Further complications arose with respect to the protruding lip of the side rails. It is common for pallets to include cargo net attachment fittings. The cargo net is one means of holding the cargo on the pallet. The fittings usually extend vertically upward from the top pallet surface and the net is fastened thereto. Some pallets have fittings mounted directly adjacent the edge of the pallet and as a result the fittings interfere with the protruding lip of the side rails. Once the pallet was in position, a series of removable protruding lips could be effectively placed to avoid interference with a fitting. However, upon moving of the pallet, the removable protruding lips have to be individually removed from their operative positions.

As is apparent from above, when employing side rails with removable protruding lips, several distinct movements would be necessary in removing and relocating the protruding lips to effect the transporting of a single pallet. Assuming there are four such lips per pallet, all four would have to be removed and relocated before the pallet is positioned, and likewise for pallet embarkment. In one airplane it is not uncommon to support twelve to twenty-four pallets. All the necessary separate operations associated with removing the protruding lips to load and unload an airplane is quite time consuming. In actual practice, if some form of self actuated protruding lip could be used which would be actuatable by the cargo pallet, the loading and unloading time could be decreased by as much as thirty percent.

SUMMARY

The apparatus of this invention is to provide a side restraint for a cargo pallet which includes a vertical restraining lip which is retractable automatically upon being contacted by any portion of the pallet or cargo net. Upon passage of the interfering portion of the pallet or net, the retracted lip is biased to automatically move back to the operative position.

Specifically, the vertical restraint of this invention comprises two arms linked together at one end with the free ends of the arms being rotatably secured to the side rail. The arms are linked through a spacer and pin arrangement, the spacer riding in a slot in one arm. The spacer and slot arrangement act as a cam and follower. The arms are rotatably spring biased a lateral distance from the side rail, the distance being determined by the length of the slot in which the spacer is confined. Each arm serves as a ramp for the interfering position of the pallet in that the pallet progressively causes retraction of the arms to permit passage thereof. The spring biased arms reposition themselves after the interfering portion of the pallet has passed.

The most apparent advantage of this invention is the elimination of the requirement to remove and replace the protruding lip portion of the side rails of a cargo handling apparatus during pallet movement. However, other important objects are to be noted such as no separate actuating mechanism is necessary. Also, the vertical restraint lip is retractable with pallet movement in either direction the device may be placed in an inexcessible location because it does not require manual actuation. Other less apparent objects are also to be known such as the device will operate effectively with only one of the two spring means being operative. Other objects and features of the invention will become apparent as the description proceeds, particularly when taken in conjunction with the accompanying drawings illustrating the invention.

BRIEF DESCRIPTION OF THE DRAWING

FIGURE 1 is a perspective view of the restraint latch of this invention in its intended environment;

FIG. 2 is a plan view of the latch of this invention in the retracted position;

FIG. 3 is a side view of the invention showing contact with a pallet fitting; and FIG. 4 is a sectional view of the arm connection taken along line 4—4 of FIG. 1.

DESCRIPTION OF THE SHOWN EMBODIMENT

Shown in FIG. 1 is the restraint latch 10 of this invention supported in a track 12. The shown installation is typical of aircraft but similar installations would be used in other types of vehicles. The track 12 is fixed to the floor 14 of the aircraft and transverse to the aircraft fuselage 16. Conveyor rollers 18 are shown which permit substantially non-frictional movement of pallet 20. A load 22 is depicted upon pallet 20.

Latch 10 has a flanged base 24 which is to coact with track 12. Track 12 has a pair of facing overhanging lips 26 and 28 which provide the necessary vertical restraint for the latch 10. Base 24 has a plunger 30 which is biased by a spring (not shown) downwardly or toward the bottom of the track 12. Track 12 has a series of apertures 32 which coact with the plunger 30. By moving plunger 30 against the spring bias by means of handle 34, the base 24 is adjustable within the track 12 and is fixedly positionable wherever an aperture 32 is located.

A guide or side rail 36 is integrally connected to base 24 and extends upwardly (or away from track 12) therefrom. Attached adjacent to the extremities of guide 36 on the top thereof are arms 38 and 40. Each arm 38 and 40 is rotatably attached to the guide 36 by means of a bolt 42. The free ends of the arms 38 and 40 connected together with arm 38 being bifurcated and arms 40 to slidingly fit between the branches of the bifurcation. Arm 40 has a longitudinal slot 44 which is of sufficient size to allow spacer or roller 46 to travel therein. A bolt 48 which passes through the branches of the bifurcated arm 38 retains spacer 46 within the slot 44 of arm 40. Each arm 38 and 40 is biased by a spring 50 and 52, respectively, such type of springs shown being a torsion spring, however, other types such as a leaf spring could be used. The springs 50 and 52 are supported by pins 54 and 56, respectively, which are fixed to the guide 36. The spring bias is such as to position the arms 38 and 40 in the expanded position to overlap the edge of the pallet 20. The springs 50 and 52 are mounted on the backside of the guide 36, the backside being the side which does not come in contact with the pallet 20.

In FIGS. 2 and 3 the pallet 20 is shown to include a cargo net fitting 58 attached to the edge of the pallet 20. Fitting 58 is merely U-shaped having an apex bar 60 and legs 62 and 64. The terminal ends of the legs 62 and 64 are removably attached to the pallet by any conventional means, the means shown here being the terminal end of each leg 62 and 64 extending horizontal and hooks under an overhanging lip of the pallet. The construction of the fitting is irrelevant to this invention it only being that this invention is designed to permit passage of the fitting when it is in interference with the vertical restraint lip.

The operation of the restraint latch of this invention is as follows: In an airplane a plurality of these latches are employed adjacent each side of the aircraft, the open transverse area between the latches defining the width of the pallets to be used. As the pallets are moved into or out of their transporting position, a portion of the load or a cargo net fitting may interfere with the vertical restraint lip portion of the latch. To eliminate removal and replacement of the latch to allow passage of the pallet, the vertical restraint portion is designed to be retractable. When contacted by a portion of the pallet, the two arms of the restraint are moved against a spring bias and re-retracted. Each arm serves as a ramp to permit the retraction with the minimum of effort. The arms are repositioned under action of the spring bias after passage of the fitting or cargo.

Having thus described this restraint latch as to one embodiment, it is to be understood that the invention is not limited thereto, as many variations will be readily apparent to those skilled in the art and the invention is to be given its broadest possible interpretation within the terms of the following claims.

We claim:
1. In combination with a cargo handling system for temporarily securing palletized cargo against movement, a restraint latch for preventing substantial transverse movement and vertical movement of the loaded pallet comprising:
 a base;
 a side rail connected to said base, said side rail forming the restraint of the transverse movement of said pallet; and
 a first arm being pivotally connected to a top portion of said side rail and forming a first pivot point therebetween, a second arm being pivotally connected to the top portion of said side rail and forming a second pivot point therebetween, said arms being pivotally connected together and forming a third pivot point therebetween, the plane formed by said pivot points being spaced from said base, said third pivot point being movable on a line which intersects a straight line connecting said first and second pivot points, said arms being biased to assume the position of rest wherein said third pivot point is displaced the maximum distance from the straight line connecting said first and second pivot points, said first and second arms when displaced said maximum distance extending over and forming a vertical restraint for said pallet.
2. A restraint latch as defined in claim 1 wherein:
 said first and second arms are biased by a torsion spring means.
3. A restraint latch as defined in claim 1 wherein:
 said third pivot point establishing the connection between said arms forming a cam and follower, said cam being a roller rotatably fixed to said first arm and said follower being a slot in said second arm.

References Cited

UNITED STATES PATENTS

| | | | |
|---|---|---|---|
| 1,259,397 | 3/1918 | Hathaway | 248—361 |
| 1,738,008 | 12/1929 | Johnson | 280—179 X |
| 2,439,423 | 4/1948 | Fowler | 248—361 X |
| 2,733,039 | 1/1956 | Balogh | 248—361 |
| 2,800,233 | 7/1957 | Jones | 248—361 |
| 3,204,581 | 9/1965 | Davidson | 248—361 |
| 3,210,038 | 10/1965 | Bader et al. | 248—361 |
| 3,306,234 | 2/1967 | Hansen et al. | 248—361 |
| 3,357,372 | 12/1967 | Bader | 248—361 |
| 3,377,040 | 4/1968 | Hansen | 248—119 |

FRANCIS K. ZUGEL, Primary Examiner

U.S. Cl. X.R.

248—119